*INVENTOR.*
JOSEPH C. LOGUE
ANDREW E. BRENNEMANN
BY Wesley De Bruin

INVENTOR.
JOSEPH C. LOGUE
ANDREW E. BRENNEMANN
BY Wesley De Bruin

*INVENTOR.*
JOSEPH C. LOGUE
ANDREW E. BRENNEMANN

BY Wesley De Bruin 2,884,557

APPARATUS, INCLUDING AN ELECTROSTATIC TYPE STORAGE TUBE, FOR STORING DIGITAL INFORMATION

Joseph C. Logue, Kingston, and Andrew E. Brennemann, Poughkeepsie, N.Y., assignors to International Business Machines Corporation, New York, N.Y., a corporation of New York Application July 1, 1954, Serial No. 440,744

1 Claim. (Cl. 315—12)

This invention relates to an improved method of storing information in cathode ray tubes.

The novel method of storing information disclosed and claimed herein is an improvement over the well-known techniques of electrostatic storage utilizing a cathode ray tube.

The prior art techniques of electrostatic storage of information, employing a cathode ray tube, are well-known in the art and are disclosed in an article entitled "A Storage System For Use With Binary Digital Computing Machines," by F. C. Williams and T. Kilburn, published in the "Bulletin of the Institution of Electrical Engineers" (Savoy Place, London, W.C. 2) March 19, 1949, pages 81–100. Refrence is also made to the text "Storage Tubes" by M. Knoll and B. Kazan, published by John Wiley & Sons in 1952.

The present invention is not directed to a single circuit or combination of electronic devices, but is a novel method. Two general arrangements for carrying out the novel method are disclosed.

The primary object of the present invention is an improved method of cathode ray tube storage and in particular, a method employing in part the well known electrostatic system of storage. For convenience the novel method herein disclosed may be referred to as the focus-defocus-dash system of storage.

A second object of the present invention is to improve the "mudhole factor" of a cathode ray tube storage system. The "mudhole factor" is defined with regard to cathode ray tube type storage as the redistribution of charge due to leakage currents.

A third object of the present invention is to improve the "spill factor" of a cathode ray tube storage system. The "spill factor" is defined as the percent loss of the total usable signal.

A feature of the present invention is that the usuable signal amplitudes resulting from the reading of a dot signal and a dash signal are each greatly enlarged.

Other objects of the invention will be pointed out in the following description and claims and illustrated in the accompanying drawings, which disclose, by way of example, the principle of the invention and the best mode, which has been contemplated, of applying that principle.

Figure 1:
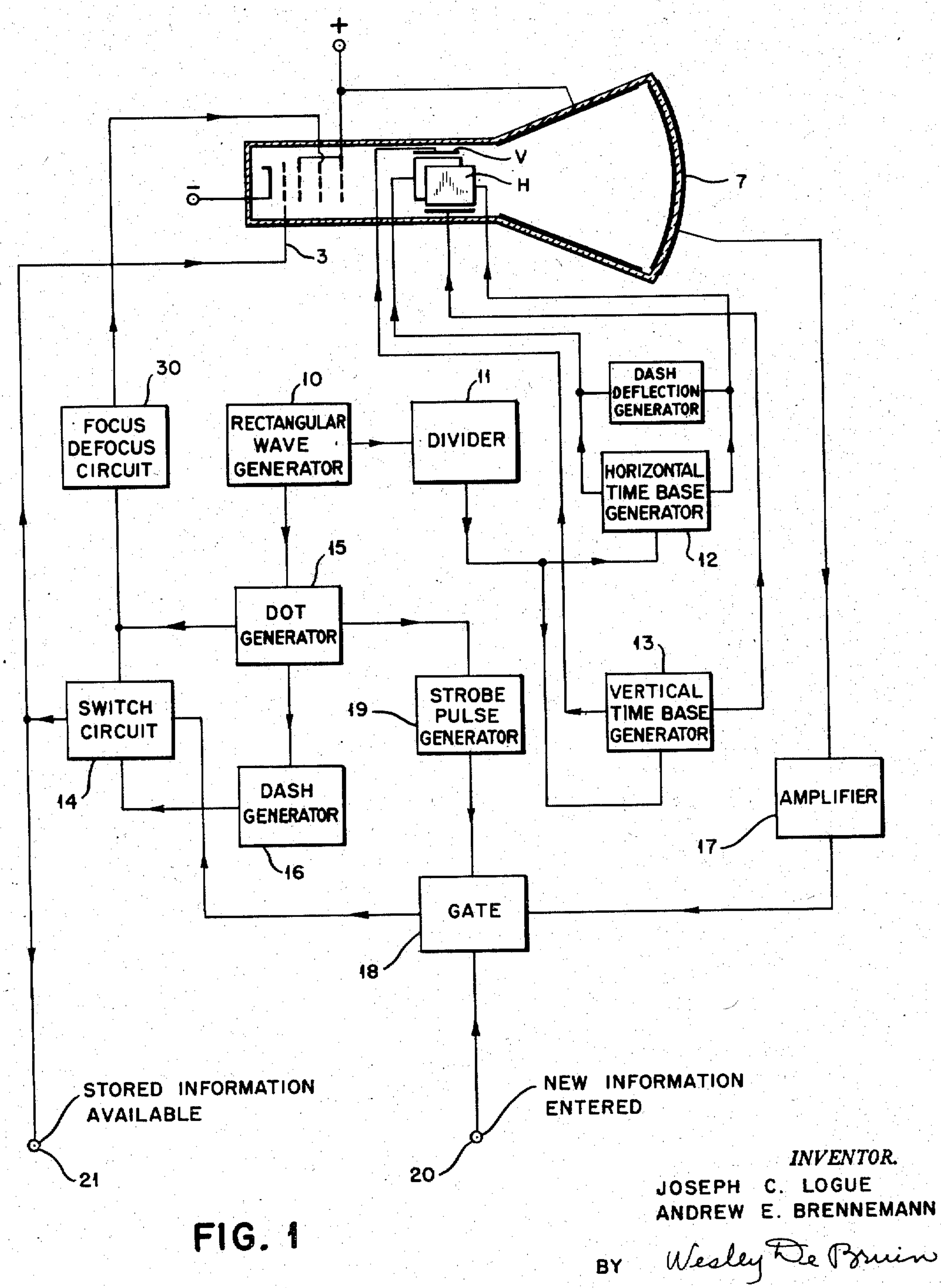
Fig. 1 is a circuit in block diagram form that may be employed for practicing the novel method of cathode ray tube storage herein disclosed.

Referring to Fig. 1, a block diagram of circuitry that may be employed to practice the novel method herein disclosed is shown. Briefly, a cathode ray beam strikes an insulating surface to produce a charge pattern. The beam is caused to irradiate a discrete area repetitively so that it assumes a particular state of charge, the beam being displaceable to irradiate an adjacent area to modify the charge on the first area. The circuitry of Fig. 1 is employed in a system using a television type raster, each line comprising a plurality of ten microsecond intervals each commencing with a one microsecond dot which may be extended for a further four microseconds to form a dash. It is known that when an exploring beam reads a dot, a negative pulse appears in the associated pick-up means, whereas when a dash is read a positive pulse in the assoicated pick-up means.

Now still referring to Fig. 1, it will be seen that a rectangular wave generator 10 feeds a divider 11 controlling the horizontal and vertical time base generators 12 and 13. The rectangular wave generator 10 also controls the short dot and the long dash pulse generators 15 and 16. A pulse appearing on the pick-up plate 7 is fed through amplifier 17 to a gate 18 which is opened for the duration of a dot by the strobe pulse generator 19. According to the polarity of the pulse occurring during the strobe period a pulse of dot or dash configuration and length is fed through the switch circuit 14 to the grid 3 of the cathode ray tube, the beam remaining on for the appropriate period. New information may be entered over terminal 20 while the stored information is available at terminal 21. A non-linear time base may be used allowing the beam to pause for the duration of a dot and the beam may be given a greater velocity between the termination of a dash and the commencement of the next dot. Thus far, the description of the circuitry of Fig. 1 is generally of the well-known type disclosed in Birtish Patent Nos. 645,691 and 657,591, and in U.S. Patent No. 2,671,607.

The novel method of the present invention necessitates the inclusion of focus-defocus circuit 30 (Fig. 1) under the control of dot generator 15. Briefly, the focus-defocus circuit performs the following function. The beam is unblanked in a sharply focused condition. A short time interval later, focus-defocus circuit 30 renders a defocusing voltage pulse and the beam is defocused. A short itme interval later, the beam is turned off in a defocused condition. If the beam read a "1," i.e., a dash, the beam is after a meditation period, unblanked in a sharply focused condition and moved from the elemental area to refill the inspected spot (i.e., the spot read by the beam) with secondary electrons. This operation of refilling causes a dash, i.e., "1" to appear on the face of the tube. If a "0" (i.e., a dot) was read by the beam upon initial inspection, the beam remains off after the inspection period. The above discussion will appear more clearly from the description that follows in conjunction with Figs. 2 and 3. The novel method herein disclosed is particularly suited for use in an electronic storage system of the general type disclosed in British Patent No. 705,482. This system is actually the dot-dash system with a meditation period (i.e., the beam is turned off and held stationary) between the writing of a dot and a dash when a dash is to be written at the elemental area under inspection.

Figure 2:
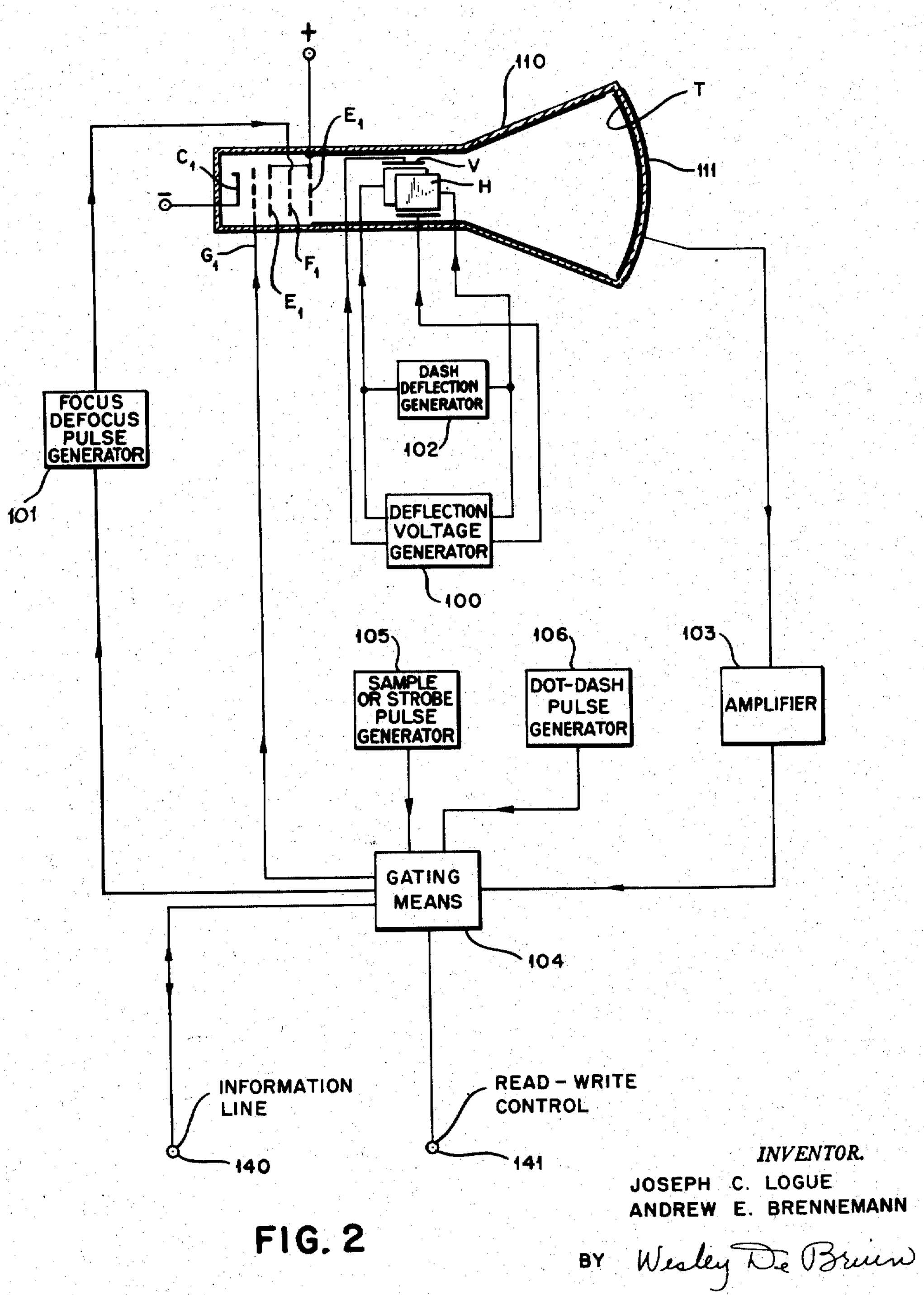
Fig. 2 is a second circuit in block diagram form that may be employed for practicing the novel method of cathode ray tube storage herein disclosed.

The novel method of electrostatic storage of information will now be explained in detail in conjunction with the block diagram circuit of Fig. 2 and the voltage waveforms shown in Fig. 3. Referring to Fig. 2, cathode ray tube 110 has a pick-up plate 111 associated with it and may be considered a "Williams' tube" arrangement. Deflection voltage generator 100 impresses the proper potentials simultaneously across the horizontal deflection plates H, and across the vertical deflection plates V so as to move the beam sequentially and repetitively over a selected pattern of elemental areas. The dash deflection generator 102 renders a waveform corresponding to $V_4$ of Fig. 3 and this waveform is impressed on the horizontal plates. (Waveform $V_4$ is superimposed on the horizontal deflection voltage generated by deflection voltage generator 100.) Focus electrode $F_1$ is connected to focus-defocus pulse generator 101. When generator 101 is in one condition a focusing potential is impressed on electrode $F_1$ whereas when generator 101 is in its other condition a defocusing potential is impressed on electrode $F_1$. Electrodes $E_1$ are connected together to a positive potential and in conjunction with focusing electrode $F_1$ constitute an electron lens system for focusing the cathode ray tube beam. The cathode $C_1$ is connected to a negative potential. Control grid $G_1$ is connected to gate 104.

Still referring to Fig. 2, it will be seen that the amplifier 103 amplifies the signals read by pick-up plate 111 and conveys them to gating means 104. Gating means 104 also receives a series of sample pulses represented by waveform $V_6$ (Fig. 3) and generated by sample or strobe pulse generator 105. Gating means 104 also receives dot-dash pulses of the configuration shown in waveform $V_1$ (Fig. 3) and generated by dot-dash pulse generator 106. An information line is connected between gating means 104 and terminal 140. The information line is used for conveying information to storage or for conveying information read from storage. Terminal 141, referred to as a read-write control, is also connected to gating means 104. Information may be read into storage by impressing a suitable potential on terminal 141, whereas information may be withdrawn from storage by impressing a second suitable potential on terminal 141.

Now for purposes of explanation, let it be assumed that the cathode ray tube beam of cathode ray tube 110 (Fig. 2) is stationary at a first elemental area of the target T. Let us assume that at this first elemental area a dot or "0" has been stored at an earlier time. Then the reading beam, when initially impressed in a sharply focused condition upon this first elemental area, will result in a negative voltage pulse appearing at pick-up plate 111 and passing via amplifier 103 to gating means 104. This negative pulse will preclude the dash pulse, i.e., a pulse of the configuration of pulse $D_{1a}$ of voltage waveform $V_1$, from being impressed on the grid $G_1$ of tube 110. In accordance with the novel method herein disclosed and claimed, the inspection beam when initially inspecting or reading an elemental area is turned on in a sharply focused condition and a short interval of time later the beam is defocused. A short interval of time after the beam is defocused, the beam is turned off. Thus it will be seen that in accordance with applicants' novel method the following steps occur upon inspection or reading of a first elemental area wherein a dot, i.e., a "0", is stored and a dot is to be retained in storage: (1) the beam is turned on in a highly focused condition; (2) the beam is defocused while remaining on; and (3) the beam is turned off while in a defocused condition.

Now consider the beam as being stationary and inspecting a second elemental area wherein a dash, i.e., a "1", has been stored. Thus upon initial inspection, a positive voltage pulse will appear at pick-up plate 111 and be impressed via amplifier 103 on gating means 104. The positive pulse impressed on gating means 104 will result in a pulse of dash configuration $D_{1a}$ being impressed on grid $G_1$ a short interval of time later, i.e., subsequently, turning on the beam in a focused condition for a short interval of time while the beam is subjected to transverse motion. This effectively accomplishes the rewriting of the dash, i.e., a "1", that was read by the beam upon inspection of the second elemental area. In accordance with the novel method herein disclosed and claimed, a short time after the beam was initially turned on for the reading of a second elemental area, the beam was defocused and remained in this condition until it was turned off. However, during the short interval of time, or meditation period, prior to being turned on for the writing of a dash, i.e., a "1", the potential on electrode $F_1$ reverted to the focusing potential level. Thus when the beam was turned on for the writing of a dash, it was in a sharply focused condition and remained in this condition throughout the writing of the dash on the second elemental area. Thus it will be seen that the following steps occur upon inspection or reading of a second elemental area wherein a dash, i.e., a "1," is stored and a dash is to be retained in storage: (1) beam turned on in a highly focused condition; (2) beam defocused while on; (3) beam turned off while in a defocused condition; (4) beam remains off for short interval of time during which the potential on electrode $F_1$ reverts to the focusing potential level; (5) beam turned on in sharply focused condition and subjected to transverse motion; and (6) beam turned off.

Figure 3:
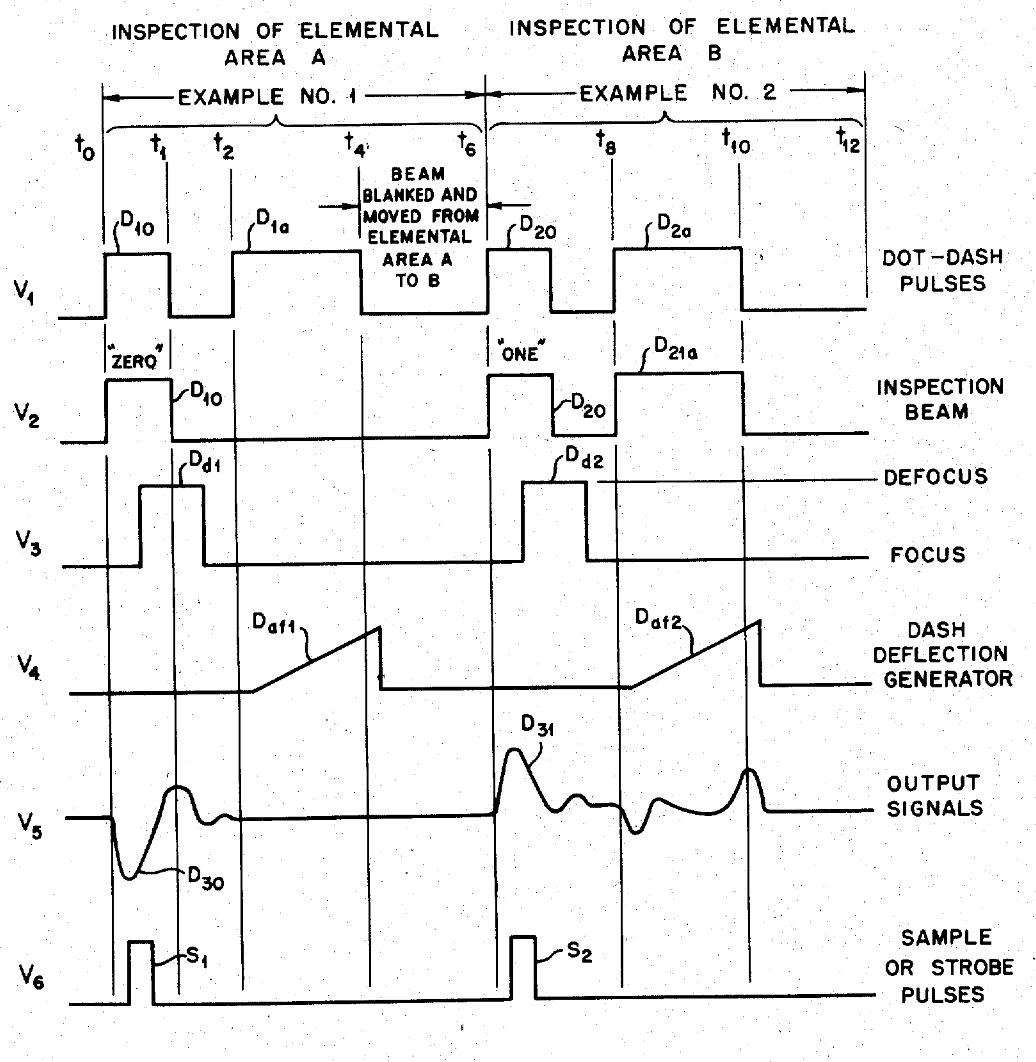
Fig. 3 discloses a group of voltage waveforms relating to the novel method of cathode ray tube storage herein disclosed when practiced by circuitry generally of the type disclosed in Figs. 1 and 2.

Now still referring to Figs. 2 and 3, the novel method will be disclosed in detail in conjunction with two examples. However as will be apparent, the examples apply equally well to the embodiment of Fig. 1.

*Example No. 1.*—Assume the beam of cathode ray tube 110 is reading or inspecting elemental area A. Then from Fig. 3 voltage waveform $V_2$, it will be seen that the beam is turned on at time $t_0$, i.e., dot pulse $D_{10}$. Assuming that a dot, i.e., a "0," was previously stored at elemental area A, then the reading beam results in a negative pulse of the general configuration of pulse $D_{30}$ (of waveform $V_5$) appearing at pick-up plate 111. As will appear more clearly hereinafter, the concurrence of the sample pulse $S_1$ of waveform $V_6$ and pulse $D_{30}$ properly conditions gating means 104.

Now still referring to Fig. 3, it will be seen that in the time interval $t_0$ to $t_1$ during which time the beam is on, the beam is defocused as a result of the occurrence of defocusing pulse $D_{d1}$ (of waveform $V_3$). This defocusing pulse $D_{d1}$ is impressed on focusing electrode $F_1$. Thus taking cognizance of the duration of pulses $D_{10}$ and $D_{d1}$, it is apparent that the inspection beam is turned On in a highly focused condition and then defocused and subsequently turned Off while in the defocused condition. That is, referring to pulse $D_{d1}$, it will be seen that said defocusing pulse terminates a short time after the beam was turned off, i.e., during time interval $t_1$ to $t_2$. The negative pulse $D_{30}$ resulting from the beam reading a dot, i.e., a "0", is conveyed via amplifier 103 to gating means 104. The sample pulse $S_1$ from generator 105 occurs simultaneously with pulse $D_{30}$. The pulses $D_{30}$ and $S_1$ properly control gating means 104 such that the dash pulse $d_{1a}$ (of waveform $V_1$), generated by generator 106 during time interval $t_2$ to $t_4$, is precluded from being applied to the grid $G_1$ of the tube 110. Thus the beam of the tube remains off from time $t_1$ through $t_6$ (see waveform $V_2$). It will be noted, however, that shortly after time $t_2$ a dash deflection pulse $D_{a11}$ (waveform $V_4$) occurs and is impressed on the horizontal deflection plates H.

To briefly summarize what took place under the conditions of Example No. 1, the following steps may be outlined. The beam is turned on (pulse $D_{10}$) in a sharply focused condition and reads a dot, i.e., a "0". Thus a negative pulse is picked up by the pick-up plate 111. The beam while still on is defocused. A short time later the beam is turned off while still in a defocused condition. Subsequently the defocusing pulse $D_{d1}$ terminates. The concurrence of the negative pulse $D_{30}$ read by the beam and a sample pulse $S_1$, through the medium of gating means 104, causes the beam to remain off throughout the remaining portion of the time interval devoted to inspecting elemental area A, i.e., time interval $t_1$ to $t_6$.

*Example No. 2.*—Referring to Fig. 3 (waveform $V_2$), it will be seen that during time interval $t_4$ to $t_6$ the beam of cathode ray tube 110 is off. Also during this time interval, the vertical and horizontal deflection potentials are so changed that at time $t_6$ when the beam is turned on elemental area B will be under inspection. (Elemental area B is displaced in space from elemental area A). Now as will be appreciated, the inspection beam is not initially aware of whether a "1" or a "0" is stored at the elemental area under inspection. Thus, the inspection beam is always initially held stationary and turned on in a highly focused condition, defocused while still on, and turned off while still defocused. (This sequence effectively reads what is stored at the elemental area under inspection, and writes a dot, i.e., "0.")

With regard to this second example, the dot pulse $D_{20}$ results in turning the beam on at time $t_6$. From waveform $V_3$ it will be appreciated that a proper focusing potential is at time $t_6$ impressed on focusing electrode $F_1$. Now since elemental area B has a dash, i.e., a "1", stored thereat, the inspection beam will result in a positive pulse $D_{31}$ of waveform $V_5$ appearing at pick-up plate 111 and being conveyed via amplifier 103 to gating means 104. It will be noted that sample pulse $S_2$ and outut pulse $D_{31}$ are simultaneously conveyed to gating means 104 and result in said gating means subsequently pasisng the dash pulse $D_{2a}$ (waveform $V_1$) and impressing it as pulse $D_{21a}$ (waveform $V_2$) on the control grid of the cathode ray tube. However, as will be apparent from an inspection of waveforms $V_2$ and $V_3$ of Fig. 3, the cathode ray tube beam was defocused as a result of defocusing pulse $D_{d2}$ shortly after being turned off in a sharply focused condition at time $t_6$. Further, it will be seen that dot pulse $D_{20}$ terminates during time interval $t_6$ to $t_8$. The termination of dot pulse $D_{20}$ effectively turns off the beam while it is in a defocused condition due to the existence of defocusing pulse $D_{d2}$. Now referring to waveform $V_2$ it will be seen that a time interval elapses between the termination of dot pulse $D_{20}$ and the initiation of dash pulse $D_{21a}$. This time interval may be referred to as a meditation period during which the beam is off. This meditation period greatly enhances the utility of storing information in a cathode ray tube when the information stored at an elemental area is to be changed.

Referring to waveform $V_3$ it will be seen that defocusing pulse $D_{d2}$ terminates prior to the initiation of dash pulse $D_{21a}$. Thus when the inspection beam is turned on, as a result of dash pulse $D_{21a}$, it is in a sharply focused condition and remains in this sharply focused condition throughout the duration of the dash pulse. Now still referring to Fig. 3 and more particularly to waveforms $V_2$ and $V_4$, it will be seen that shortly after the beam is turned on by dash pulse $D_{21a}$ the beam is subjected to transverse motion due to the impressing of dash deflection pulse $D_{af2}$ on the horizontal plates H of the cathode ray tube. This effectively places in storage a dash, i.e., a "1", at elemental area B.

To briefly summarize what took place under the conditions of Example No. 2 the following steps may be outlined. The beam is turned on in a sharply focused condition and reads a dash, i.e., a "1." Thus a positive pulse is picked up by the pick-up plate. The beam while still on is defocused. A short time later the beam is turned off while still in a defocused condition. Now during the meditation period the defocusing pulse terminates. Subsequent to the meditation period the beam is turned on in a sharply focused condition and subjected to transverse motion to effectively write a dash, i.e., a "1."

It will be apparent to those skilled in the art that during the meditation period (without regard as to whether a dot or dash was stored there) a determination can be made whether a dot or a dash will be placed in storage at the elemental area under inspection.

Further, it will be appreciated that applicants' novel method can be referred to as the focus-defocus-dash system of storage. Aside from the meditation period, which in itself applicants make no claim to, the writing of a dash is conventional. That is, during the impression of a pulse of dash duration on the control grid of the cathode ray tube the beam is in a sharply focused condition and remains in this condition while being subjected to transverse motion.

The advantage of turning On the beam in a focused condition and turning the beam Off while in a defocused condition is two-fold. In the first place, since the "mudhole factor" arises from a redistribution of charge due to leakage currents, it is reasonable to assume that the region in the center of a surface charge of circular shape would be the last to lose its charge. When the beam is turned On in a sharply focused condition, it bombards an area whose charge density is relatively undisturbed. The other advantage arises from the fact that when the beam is defocused at about the middle of its On period, an additional quantity of negative charge is removed from the bombarded area. In the dot-dash system when a beam bombards an area that has previously been bombarded, most of the low energy secondary electrons cannot leave the potential well formed by the positively charged area. These low energy electrons build up a space charge. This process of space charge build-up produces a negative voltage at the pick-up electrode. In the case of the focus-defocus-dash system herein disclosed the process is almost identical. However, some of the low energy secondary electrons are captured by the positively charged ring surrounding the central area that is under bombardment by the sharply focused spot. This results in a larger negative signal at the pick-up electrode.

In the investigation of the focus-defocus-dash system herein disclosed, the "mudhole factor," "signal amplitude," and "spill factor," were respectively compared with that of the defocus-focus system and the dot-dash system. The overall results greatly favor the focus-defocus-dash system of storage herein disclosed and claimed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

Apparatus for storing digital information including an electrostatic type storage tube, deflection means for directing the beam of said tube to selected elemental areas of a storage surface during successive time intervals, first means operative during each interval for turning on said beam in a highly focused condition, subsequently defocusing said beam and thereafter turning off said beam; and additional means co-operating with said first means for subsequently turning on said beam in selected ones of said time intervals in a sharply focused condition and subjecting said beam to transverse motion.

References Cited in the file of this patent

UNITED STATES PATENTS

| | | |
|---|---|---|
| 2,093,157 | Nakashima et al. | Sept. 14, 1937 |
| 2,423,304 | Fitch | July 1, 1947 |
| 2,436,827 | Richardson | Mar. 2, 1948 |
| 2,438,709 | Labin et al. | Mar. 30, 1948 |
| 2,769,935 | Williams et al. | Nov. 6, 1956 |
| 2,807,749 | Williams | Sept. 24, 1957 |

FOREIGN PATENTS

| | | |
|---|---|---|
| 151,548 | Australia | May 22, 1953 |

UNITED STATES PATENT OFFICE

CERTIFICATE OF CORRECTION

Patent No. 2,884,557 April 28, 1959

Joseph C. Logue et al

It is hereby certified that error appears in the printed specification of the above numbered patent requiring correction and that the said Letters Patent should read as corrected below.

Column 2, line 12, after "pulse" insert -- appears --; column 5, line 26, for "off" read -- on --.

Signed and sealed this 12th day of April 1960.

(SEAL)
ıttest:

KARL H. AXLINE
.ttesting Officer

ROBERT C. WATSON
Commissioner of Patents